United States Patent [19]

Regan

[11] Patent Number: 4,892,440
[45] Date of Patent: Jan. 9, 1990

[54] WATER BACKUP PREVENTING SYSTEM AND MONITORING SYSTEM THEREFOR

[75] Inventor: Patrick Regan, Chicago, Ill.

[73] Assignee: Eveready Flood Control, Elmwood Park, Ill.

[21] Appl. No.: 215,545

[22] Filed: Jul. 5, 1988

[51] Int. Cl.$^4$ .............................................. E03F 1/00
[52] U.S. Cl. ....................................... 405/36; 137/110; 210/104; 210/117; 210/170; 405/43; 405/52
[58] Field of Search ............... 137/565, 236.1, 110, 137/386, 397; 405/36, 43, 52; 210/104, 117, 136, 137, 170; 417/40

[56] References Cited

U.S. PATENT DOCUMENTS

| | | | |
|---|---|---|---|
| 1,119,909 | 12/1914 | Walling | 210/117 X |
| 1,221,251 | 4/1917 | Weinhold | 137/236.1 X |
| 3,229,707 | 1/1966 | Suchan | 137/236.1 |
| 3,919,848 | 11/1975 | Sullivan | 405/43 |
| 4,150,683 | 4/1979 | Simon | 137/236.1 X |
| 4,245,664 | 1/1981 | Johnson | 137/236.1 |
| 4,272,640 | 6/1981 | Baumbach | 137/110 |
| 4,457,646 | 7/1984 | Laesch | 405/36 X |
| 4,529,359 | 7/1985 | Sloan | 417/40 X |

FOREIGN PATENT DOCUMENTS 1052658  1/1954  France ................ 137/386

Primary Examiner—Stephen M. Hepperle
Attorney, Agent, or Firm—Wallenstein, Wagner & Hattis, Ltd.

[57] ABSTRACT

A water backflow preventing system is provided for a given area having a sewer line for receiving rain and other water where the sewer line is incapable of carrying, without backup, a given fow rate of water. The sewer line is provided at a given point therealong with at least one overflow opening into which opening water which cannot be handled by the sewer line will rise and overflow. Water storage tank means are buried in the ground below the sewer line and into which the overflow water from said opening will drain and be temporarily stored. The storage tank means have a volume to store many thousands of gallons of water which cannot otherwise flow in the sewer line. A pump is placed in the bottom of the storage tank means. Various float switches are placed in different parts of the system for controlling the pump. They are arranged to prevent the operation of the pump when water backup valve conditions exist in the sewer line and to automatically render the pump means operative when backflow conditions disapear from the sewer line so that the storage tank means can be substantially emptied and accommodate overflow conditions which can be caused by a subsequent rainstorm.

28 Claims, 7 Drawing Sheets

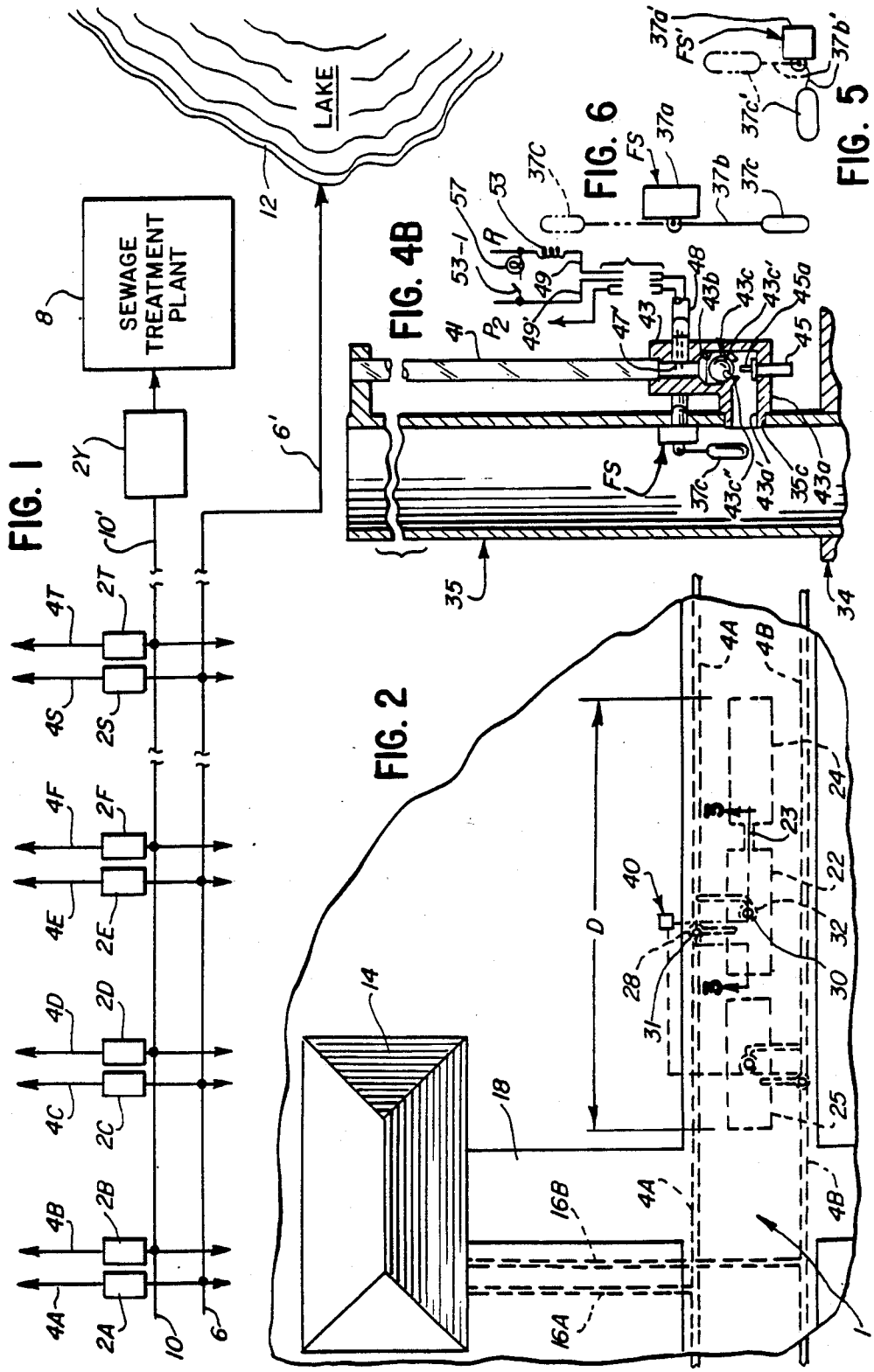

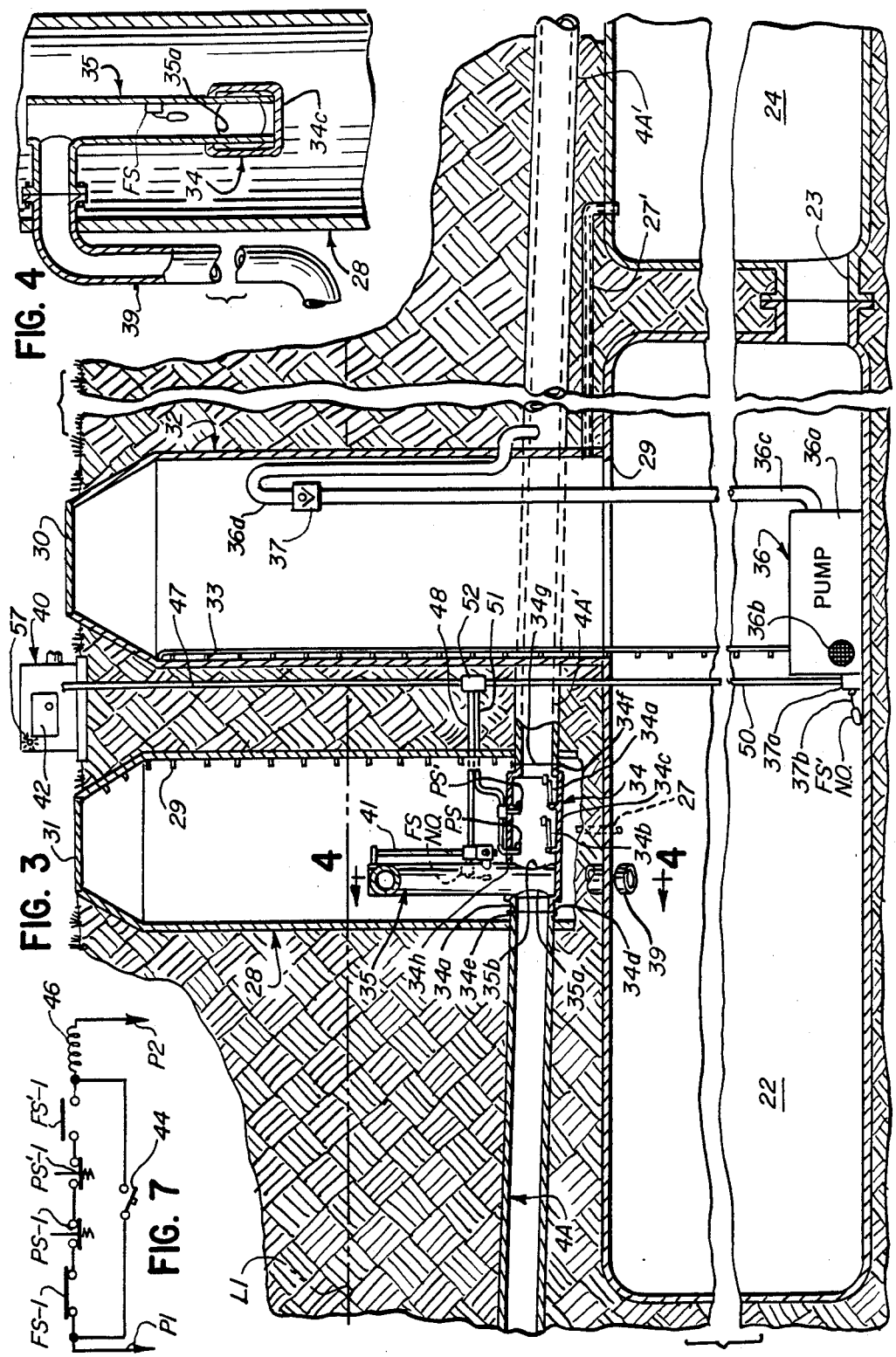

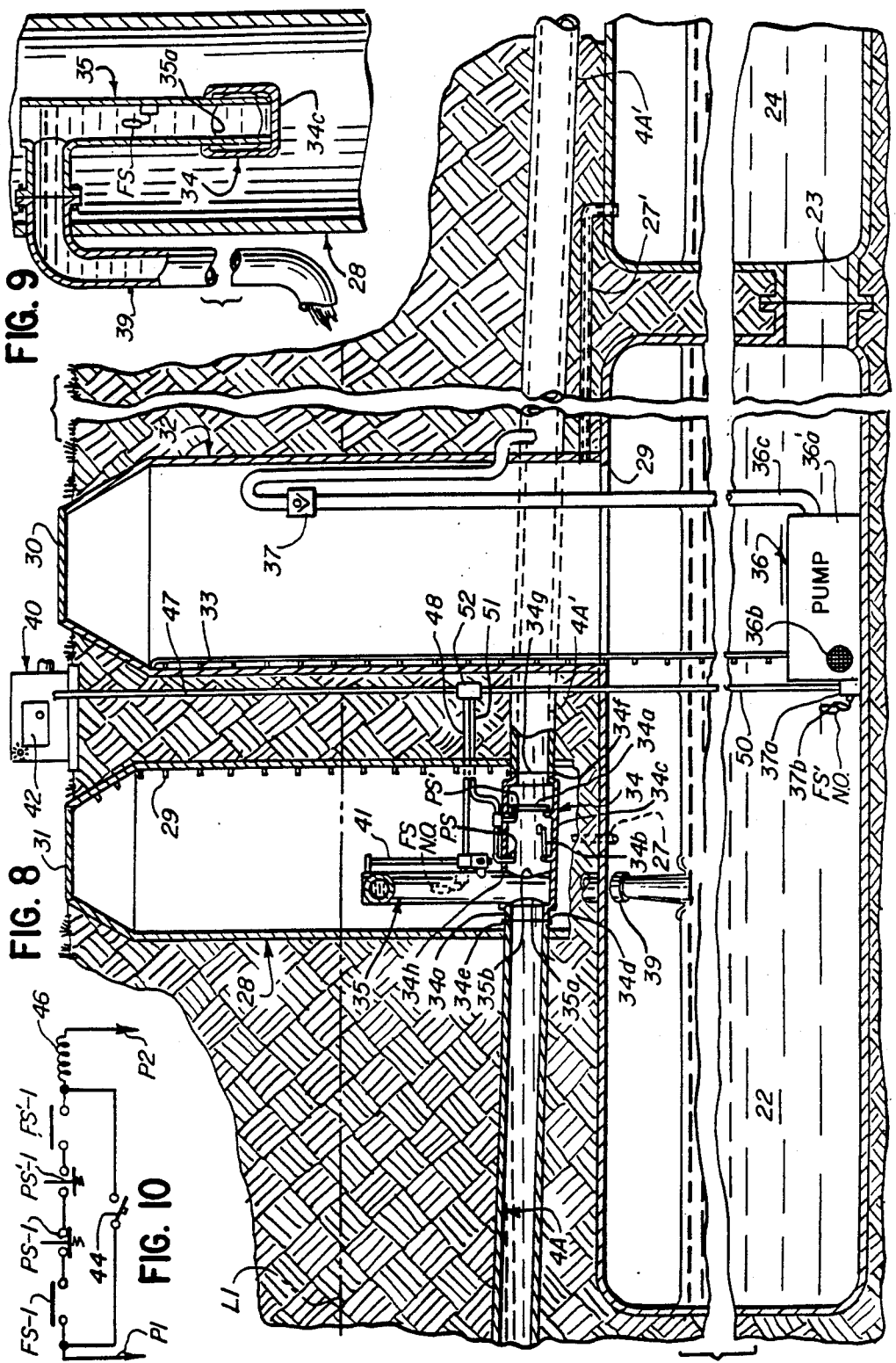

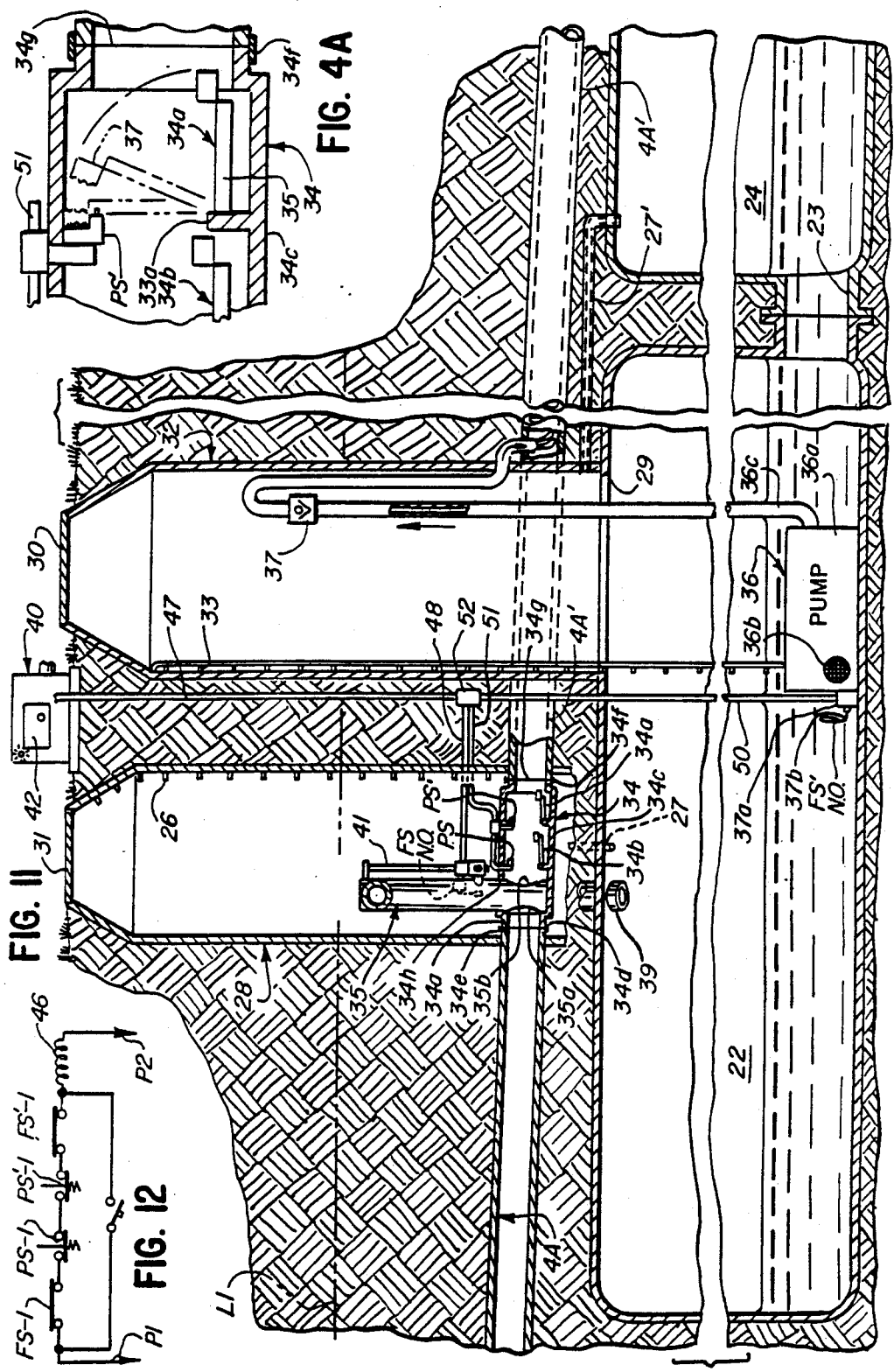

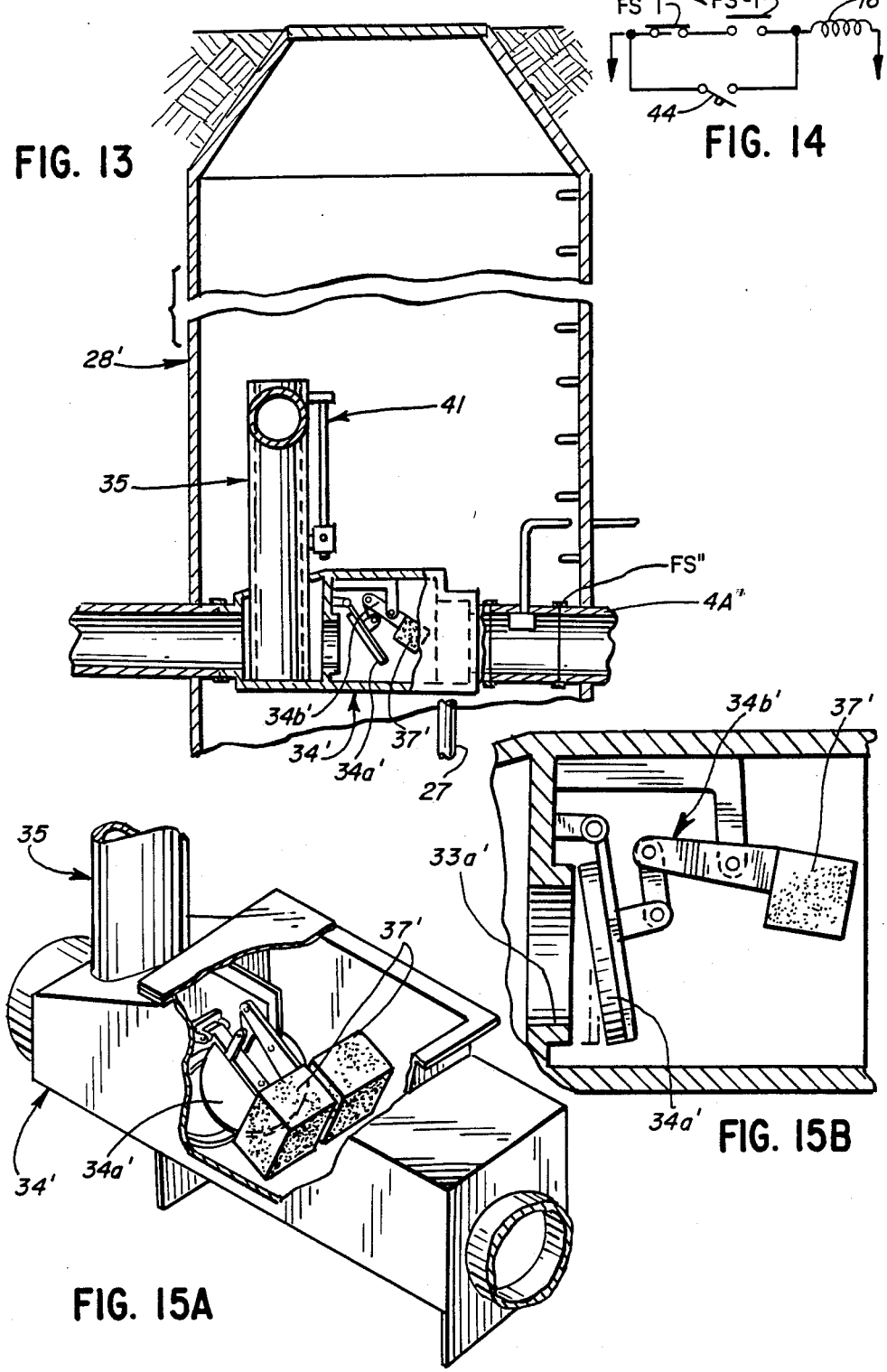

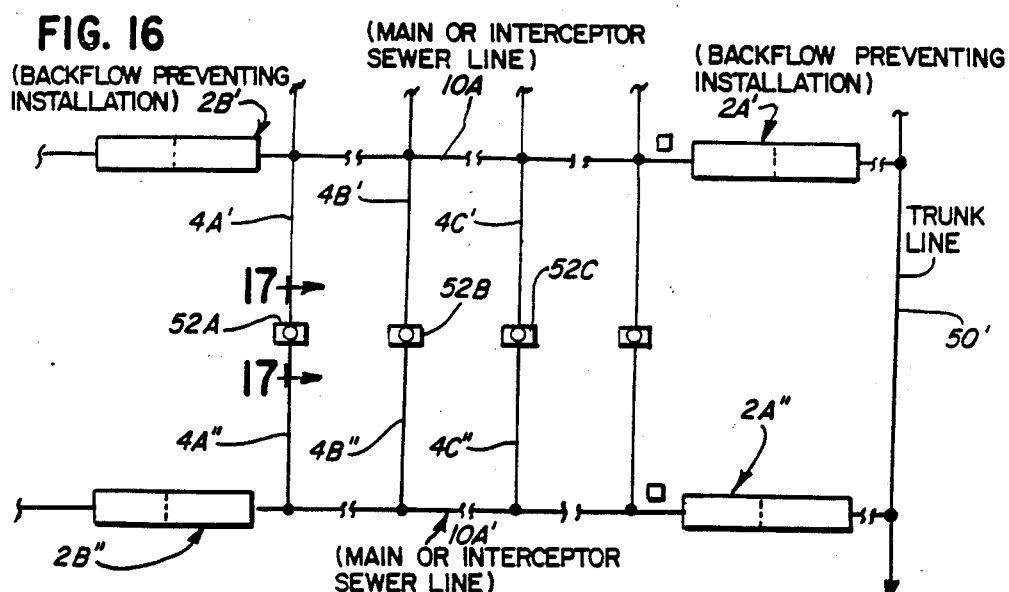
FIG. 16
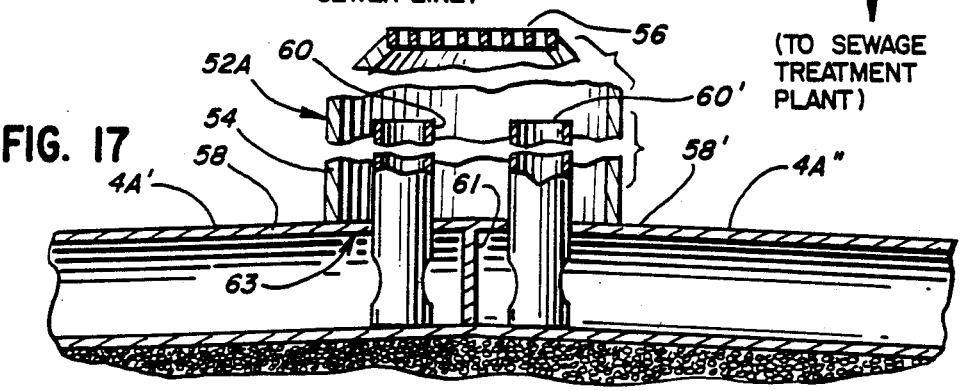
FIG. 17
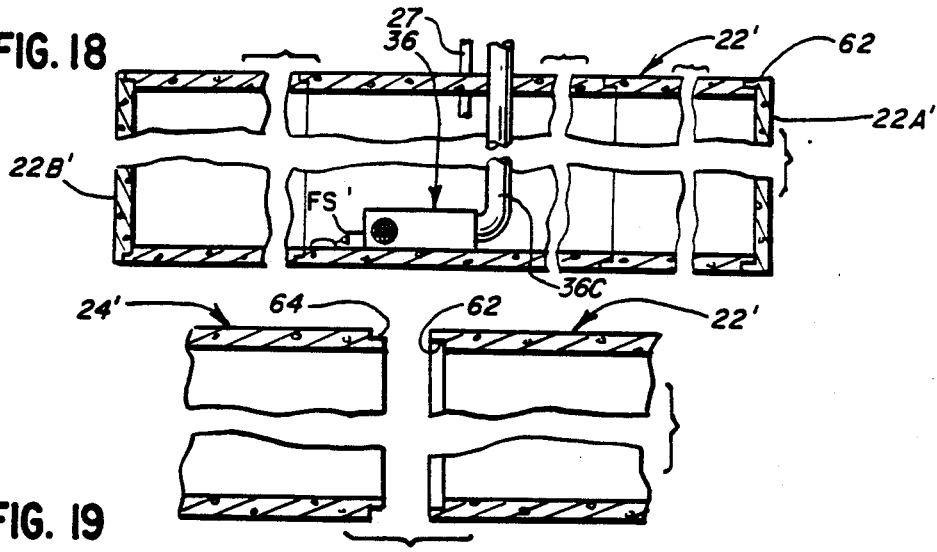
FIG. 18
FIG. 19

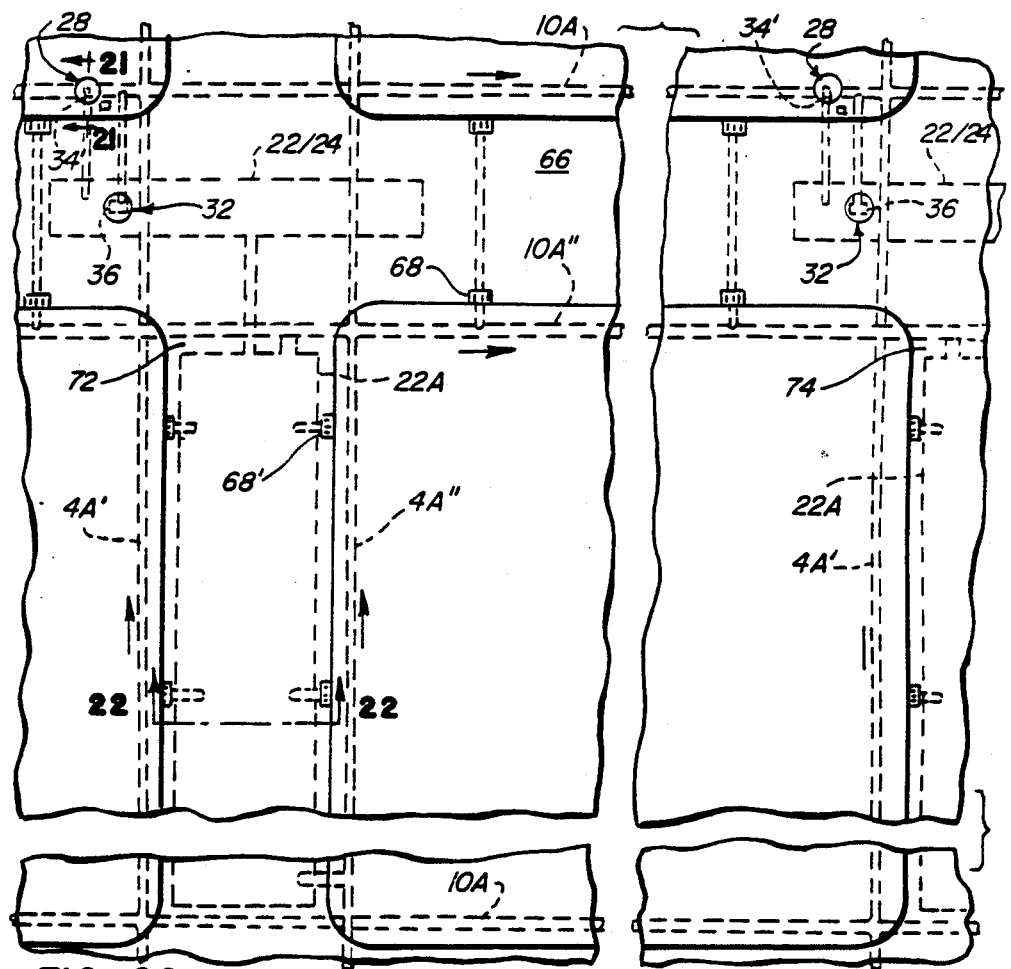
FIG. 20
FIG. 22
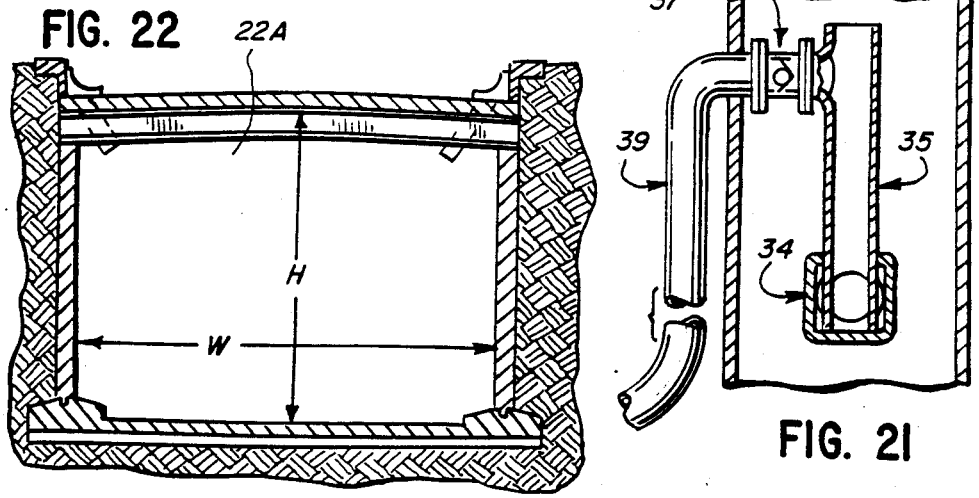
FIG. 21

WATER BACKUP PREVENTING SYSTEM AND MONITORING SYSTEM THEREFOR

DESCRIPTION

1. Technical Field

This invention relates to a unique water backup preventing system for minimizing the possibility of home flooding caused by sewer backup. Its main application is in a water backflow preventing installation or system which is duplicated in various areas of a city or town, each installation serving a large number of homes lining streets many blocks long. However, the invention has some but a very limited application when installed adjacent an individual home where the governmental body involved has failed to install an area-wide system.

2. Background of Prior Art

The problem of basement flooding from sewer line water backup has become prevalent in recent years. This backup problem obviously occurs when the flow capacity of a sewer system is exceeded by the rain water in-flow rate into the system. The risk of water backup is present in most storm sewer systems where the storm sewers are rarely of a sufficient size to accommodate unusually heavy rainstorms. This risk is sometimes present in a sanitary sewer system where there is water leakage into the sewer line through manholes, cracks in sewer line joints or where improper roof downspout connections are made to the system which normally should only carry the water and sewage draining from sinks, toilets, washing machine drain lines and basement floor drains.

Backup problems in sanitary sewer lines leading to an individual home can be substantially eliminated by the application of a back flow preventing valve in the pipeline extending between the home and the underground sanitary sewer line running along the street involved. When backup water pressure builds up, the back flow preventing valve is closed or closes to prevent the water in the sanitary sewer line from backing up into the user's home. Of course, the downspouts of the user's home where such a backup valve is installed must not be connected to the pipe leading to the sanitary sewer or else the owner's own downspout rain water would create a backup problem in the owner's home. However, many home owners simply do not wish to incur or cannot afford the cost of such a backflow preventing valve installation.

Most homes have drain tile at their foundation footings and outside drains which collect rain water directed through pipes leading to the storm sewer line running underground along the street involved. A backflow preventing valve placed in the pipeline leading from the street storm sewer line to these rain water collection points of a home would not alleviate a basement flooding hazard because the water collected in these drain tiles and outside drains would build up behind a closed backflow preventing valve to cause a flooding problem.

To minimize backup problems from a storm sewer system, a number of expensive methods have been heretofore proposed. Where there are adequate spaces and tax revenues available for doing so, water drainage ponds and lakes have been constructed to collect excess rain water run-off before the water can gain direct access to the storm sewer system. Such drainage ponds or lakes are usually not feasible. Moreover, recently it has been discovered that such drainage ponds and lakes have created drinking water contamination problems if the area obtains its drinking water from underground wells or streams into which the water in the drainage ponds and lakes can drain.

Storm sewer backup can also obviously be minimized by increasing the size of the storm sewers making up a citywide storm sewer system. However, this is obviously an extremely expensive and usually impractical solution to the problem, unless the storm sewer system has to be replaced for other reasons.

The present invention in its most useful form presents a unique approach to minimizing water backup problems in both sanitary and storm sewers on an area-wide basis, encompassing large numbers of homes along streets many blocks long, and at a small fraction of the cost of replacing the sewer systems involved.

SUMMARY OF THE INVENTION

The present invention involves both broad and specific aspects. Thus, while in its most practical and ideal form it encompasses the many specific features to be described and claimed, its most basic aspect involves a unique modification of and addition to a small section of sewer line which collects rain water from an area which can encompass many blocks along which the homes to be protected are located. For example, at a point where a branch sanitary or storm sewer line joins a main or interceptor sanitary or storm sewer line, and/or at one or more points along the main or interceptor sewer line, a small section of the sewer line is interrupted or modified to provide a water overflow opening at the top thereof. This overflow opening drains into one or more storage tanks located preferably just below the level of the bottom of the sewer line section involved or into a large underground water storage cavern with walls made of concrete or other suitable material. A pump is provided at the bottom of one of the storage tanks or caverns and a pump control system is provided which automatically operates the pump to empty the water storage area involved only when such overflow water conditions abate. The manner and timing of the filling of these water storage areas is also an important specific aspect to the invention to be described.

Where a storage tank is used to hold the overflow water, it can be a conventional gasoline storage tank used in gas stations. A typical gasoline storage tank has a diameter of from 12 to 15 feet and a length of approximately 20 feet and can store 25,000 gallons of storm water. Instead, there could also be one or more very large diameter interceptor sewer line sections many feet in diameter (as compared to the much smaller sewer line sections under the street involved) and closed off at their ends by closure caps to form a storage tank. The storage tank capacity of a given backflow preventing installation can be increased by merely removing one of the end caps, adding one or more other sewer line sections, and then capping the outer sections.

These tanks can be installed under the street or within the usual city easement lines and arranged end-to-end along a line running beneath the level and parallel to the sewer line section involved. A desired storage tank volume can be computed from rain flow data of the city or area involved. When more than one tank is desired, the bottom portions of adjacent tanks are interconnected by a pipe extending between the bottom portions thereof. Ideally, a storage tank capacity is selected which can accommodate the full overflow water capacity required for the heaviest rainstorm recorded for the area involved. However, cost limitations for a storm sewer line may require that less than the ideal storage tank capacity be provided. The risk of backup can nevertheless be greatly reduced at a modest cost when the present invention is installed. Some of the specific aspects of the invention will accommodate rainstorms of a modestly more severe extent than the storage capacity of the storage tanks can accommodate.

In accordance with a preferred specific aspect of the invention, there is provided between ground level and the sewer line section involved a manhole which preferably extends all the way down to the top level of the sewer line. Generally, the sewer line is below the level of the deepest basement in the area involved, such as 5 feet below basement grade. The bottom of the manhole opens into an interrupted section of the sewer line where a backflow preventing valve is preferably installed in the sewer line downstream from the overflow opening. This backflow preventing valve is closed or closes when the sewer line cannot accommodate a heavy flow of water involved. Any continuing flow of water on the upstream side of a closed valve will cause water to build up behind the valve where it ultimately flows into the overflow opening. Water flowing into this opening preferably initially is directed to a standpoint inserted into this opening or into the manhole. When the water level in the standpipe or manhole approaches the deepest basement level in the area, the water is carried by a drain pipe to the water storage area involved.

Where the invention is applied throughout a city, there could be a number of backflow preventing valves connected in series throughout the system. These backflow preventing valves can close and open at different times under the different conditions involved in the different parts of a city-wide sewer line system. The backup preventing valves permit the sewer line sections upstream from a closed backup preventing valve to be useful for storm water retention purposes, and each isolates the area upstream of a backflow preventing valve from backup conditions which may exist from a given rainstorm only downstream of the valve.

As previously indicated, the pump in the bottom of the storage tank will pump water into the sewer line on the downstream side of the backflow preventing valve described only when the backflow condition thereat abates. A float switch may be placed in the bottom portion of a storage tank or other water storage area involved. The switch closes when the water in the storage area causes a float ball portion of the float switch to rise above the bottom thereof. This float switch is connected in series with a "prepare" switch at the location involved which opens when a backflow condition exists thereat to prevent the pump from operating until the backflow condition abates, since the pump cannot pump water into a sewer line where water backup is occurring.

In the absence of a backflow valve, this "prepare" switch can be placed in a standpipe or manhole which joins with the overflow opening which would be on the upstream side of the valve if a backflow valve were to be used. The switch opens when water rises in the standpipe or manhole because of water backup. The valve instead could include a prepare switch which opens when the valve closes. If it is anticipated that the backflow valve could be absent or removed from the system for repair or other reasons, the prepare switch in the standpoint or manhole could be used in series with the valve prepare switch. If the valve is to be a conventional valve which does not have a prepare switch, then some other means is provided for sensing backup pressure downstream of the valve. In such case, there would be no need for a prepare switch in the upstream standpipe or manhole. The standpipe or manhole prepare switches can be float switches.

When the backflow preventing valve is closed or closes and the water behind the valve rises into the upstream standpipe, the "prepare" switch or switches will be open so that the pump in the water storage area cannot be energized. The overflow water drain pipe connects preferably the upper portion of the standpipe but below basement level to the storage tanks. If the valve closing backup conditions persist so that water rises to a point where it flows into the drain pipe, the float switch in the storage tank will close.

When water drains from the standpipe or manhole, usually because backflow conditions have abated, the "prepare" switch or switches close so that the then closed float switch on the bottom of one of the storage tanks will operate the pump to substantially empty the water storage area involved. If the backup condition did not persist long enough to cause water to flow into the water storage area, the float switch therein is open and the pump is not operated.

As previously indicated, the invention in its broadest aspect does not need a backflow preventing valve since in such case the "prepare" switch in the standpipe or manhole referred to will open and close respectively when backflow conditions immediately downstream from an installation of the invention respectively begin and abate, to control the pump in a manner to effectively empty the storage tank.

Another aspect of the invention is the interconnection of overflow preventing systems of different areas so that if the storage tank capacity of one area is exceeded while that of the other area is not, overflow water will flow into the not yet overloaded sewer lines or storage tanks of the latter area.

The great flexibility of the present invention is illustrated by another embodiment of the invention. In the previously disclosed embodiments of the invention, the water storage area is located below the level of the storm or sanitary sewer lines, so that backup water in the sewer lines flows by gravity down into this area through the drain pipe leading from the overflow water standpipe. In accordance with this embodiment of the invention, a separate sewer line is provided for street run-off water. If an installation of the present invention applied to a combined storm and sanitary sewer line system proves inadequate in a given area of a city, where the water storage area is below basement level, another water storage area for street run-off water is provided. The added storage areas has a bottom extremity at the level of the bottom of the former water storage area and a top extremity which can extend to any level. If it is so located below a street, to provide for maximum water storage capacity for street run-off water, the added storage area extends to just below street level. The bottom extremities of the two water storage areas are interconnected. The drain pipe from the overflow standpipe or manhole associated with the storm and/or sanitary sewer line which collects home water sources is provided with a backflow preventing valve so that water in the water storage area collecting street run-off water cannot cause backup in the homes involved. Street run-off water draining into the added storage area is pumped into the storm and/or sanitary sewer lines system which collects home water sources by the pump in the bottom of the originally installed water storage area in the same manner as previously described, when backup water conditions have abated. If the backflow preventing system is installed initially in a combined storm and sanitary sewer line system when it is initially determined that additional water storage capacity is needed to store the street run-off water, only a single water storage area is needed. As previously indicated, this water storage area could be an underground cavern built of concrete walls extending from way below the sewer line and basement level to just below street level. The backflow preventing valve and the drain pipe leading from the overflow water standpipe as just described prevents water rising in this water storage area above basement level from reaching that part of the sewer system which connects with the homes.

A better understanding of these and other features of the invention (such as a monitoring system therefor) will be obtained upon making reference to the specification, drawings, and claims.

DESCRIPTION OF DRAWINGS

FIG. 1 is a diagram identifying by lines various storm and sanitary sewer lines throughout a city-wide area, and identifying by unmarked boxes various points of the sewer system where a backup water control system of the present invention are installed;

FIG. 2 is a fragmentary plan view of that portion of a street where a backup water control system of the present invention has been installed both in a storm sewer line and a sanitary sewer line extending beneath the opposite sides of the street thereshown;

FIG. 3 is a vertical sectional view along a jagged section line 3—3 of FIG. 2, showing the various portions of a backup water control system installed in the storm sewer line shown in FIG. 2 when the system is in dormant state (i.e. when no water is present in the system);

FIG. 4 is a fragmentary, enlarged, vertical sectional view through part of the left manhole shown in FIG. 3, taken along section line 4—4 therein;

FIG. 4A is an enlarged vertical sectional view through the bottom portion of one of the manholes shown in FIG. 3 which shows more details of the backflow preventing valve found at the bottom of the manhole;

FIG. 4B is an enlarged vertical sectional view through the standpipe shown in the bottom portion of the manhole of FIG. 3;

FIG. 5 is a view which shows in solid lines the position of a float ball portion of a float switch in the bottom of a storage tank of FIG. 3, when there is no water in the tank, the float ball having switch contacts therein which are then open, and shows in dashed lines the position of the float ball when there is water in the storage tank and the switch contacts are closed;

FIG. 6 is a view showing another float switch shown in FIGS. 3 and 4 in a stand pipe at the top of a back flow preventive valve connected with the sewer line, and shows in solid lines the position of the float ball portion of the float switch in a non-floating lowered position when there is no water in the standpipe and the switch contacts thereof are closed, and shows in dashed lines the raised floating position of the float ball where the contacts of the float ball became open;

FIG. 7 is a circuit diagram of the energizing circuit for a relay which controls the operation of the pump motor in the storage tank, and shows switch contacts of the float ball in the storage tank open and the other float ball contacts closed when the backup water control system is in its dormant mode, and also shows a manually operable switch which bypasses the float ball switch contacts so that the pump can be independently energized from a control panel;

FIG. 8 is a view corresponding to FIG. 3 showing the condition of the various parts of the backup water control system of the invention, when the system is in its backflow mode of operation when the sewer line cannot handle the rain water involved, and the rain water overflows the standpipe and drains into the storage tanks;

FIG. 9 is a view corresponding to FIG. 4 which shows the position of the float ball in the standpipe during the back flow mode of operation of the system;

FIG. 10 is a circuit diagram corresponding to FIG. 7 showing the modified condition of the float ball switch contacts when the backup water control system is in its backflow mode of operation where the pump is still not energized;

FIG. 11 is a view corresponding to FIG. 3 showing the condition of the various parts of the backup water control system of the invention when it is operating in a tank-emptying mode, which occurs when backflow conditions abate and the storage tanks are automatically emptied;

FIG. 12 is a circuit diagram illustrating the condition of the float ball contacts when the backup water control system is operating in its tank-emptying mode, where all float ball switch contacts are closed to energize the pump in the bottom of one of the storage tanks;

FIG. 13 is a vertical sectional view through a modified manhole which replaces the left-hand manhole shown in FIG. 3 and wherein there is provided at the bottom of that manhole a commercially available backflow preventing valve construction modified with the addition of the standpipe shown in FIG. 3, and wherein the float valve previously in the latter standpipe has been moved to another standpipe downstream from the backflow preventing valve inaccessible at the bottom of the manhole;

FIG. 14 is a circuit diagram like that shown in FIG. 7 for controlling the pump in the storage tank involved, and showing in the modified form only two backflow switches connected in series required to operate the pump;

FIG. 15A is a perspective view of the backflow preventing valve shown in FIG. 13;

FIG. 15B is a sectional view through the backflow preventing valve shown in FIG. 15A;

FIG. 16 is a diagram illustrating by various lines combined sanitary and storm sewer lines of two different areas of a portion of a city, town or the like where backflow preventing installations of the present invention are installed. The sewer lines for these different areas being interconnected through common manholes containing standpipes to provide a unique interconnection between these two sewer line systems so that when the capacity of the installations of the present invention associated with one of the sewer line systems becomes overloaded, the other one is still able to receive excess water from the overloaded system;

FIG. 17 is a view taken generally along line 17—17 of FIG. 16 showing the branch sewer lines of the two sewer line systems shown in FIG. 16 interconnected through a common manhole with standpipes;

FIG. 18 shows a modified form of the invention where the storage tanks associated with each of the backflow preventing installations of the present invention comprise conventional large diameter sewer line sections closed off at the ends thereof;

FIG. 19 is a view showing how adjacent open ends of these large diameter sewer line sections can be readily interconnected to extend the storage capacity of the storage tank system, as desired, where the existing storage tank has inadequate capacity and needs to be expanded;

FIG. 20 is a plan view of an area of a city having a combination storm and sanitary sewer line system in which one of the embodiments of the invention shown in FIGS. 1-19 were previously installed, and further including additional improvements which further reduce possible water backup problems;

FIG. 21 is an enlarged vertical sectional view through FIG. 20, taken along section line 21—21; and FIG. 22 is an enlarged vertical sectional view through an additional water storage area added to the previous installation, and taken along section line 22—22 in FIG. 20.

DESCRIPTION OF EXEMPLARY FORM OF THE INVENTION SHOWN IN THE DRAWINGS

Refer now to FIG. 1 which illustrates the manner in which the present invention is utilized. The line pairs 4A-4B, 4C-4D, ... 4S-4T respectively represent branch storm sewer and sanitary sewer lines running under and along various side streets in a given city or town. These various sewer line pairs can extend many blocks in the directions indicated by the arrows thereshown. At each point, the branch storm and sanitary sewer lines along each of a number of side streets join larger branch or main storm and sanitary sewer lines 6 and 10 passing under and along another street extending at right angles thereto.

The backup water control installation of the invention can be installed at various points along the side and main streets of a city or town. They are particularly positioned at least where branch sewer lines join a larger branch or main sewer line. FIG. 1 shows a backup control installation of the invention installed at such points. These backup control installations are respectively indicated in FIG. 1 by blocks 2A-2B, 2C-2D ... 2S-2T. Each of these installations is made by interrupting a small section of the sewer lines involved and, where necessary, by breaking up a short section of the streets involved and installing the various parts of each installation to be described. While not required in the broadest aspect of the invention, each of the backup control installations 2A, 2B, etc., preferably includes a backflow preventing valve unit which prevents any backup from the downstream side of the valve. Thus, for example, if there are backup problems which develop along the main sewer lines 6 and 10, the backflow preventing valves at the in-feed points along the side streets will close off the side street sewer lines involved to isolate the upstream sides of these valves from flooding problems on the downstream sides of the valves.

The sanitary sewer line 10 discharges its water either directly, or indirectly through other sewer lines, into last sanitary sewer line section 10' immediately in advance of a sewage treatment plant 8. Between the sewer line 10' and the input to the sewage treatment plant 8 another flood control installation 2Y is preferably installed. It is designed to handle a much larger volume of water than are the individual backup water control installations 2A, 2B, etc.

The various installations of the invention to be described associated with the sanitary sewer lines enables the sanitary sewer to process all the sewage involved. Heretofore all the sewage in the sanitary sewer lines overloaded with rain water could not be handled by the sewage treatment plant and so because of the inability of the plant to handle large amounts of storm water which have gained access to the sanitary sewer lines. Therefore, untreated sewage had to be directed from the plant and dumped into lakes or streams to cause undesired pollution thereof.

The storm sewer line 6 in FIG. 1 is shown connected to a last sewer line section 6', which discharges the storm sewer water into a lake 12.

As previously indicated, each backup control installations 2A, 2B, etc. of the invention provides, among other things, temporary water storage areas in a desired number of storage tanks interconnected at the bottoms thereof to provide a desired temporary water storage capacity for the particular area served thereby. In its most ideal form, the size of the various storage tanks in all the installations can accommodate the rain water from the largest expected rainfalls evenly distributed over the city involved, and where all the backflow valves are assumed to close at about the same time. Cost restrictions could require a lesser number of storage tanks. In any event, the present invention substantially reduces flooding risks.

In addition to the selection of a useful number of storage tanks, the various aspects of the present invention include the unique placement of various water level sensing devices, preferably float switches, manholes, standpipe and backflow preventing valves, and a pump which will operate automatically only when water backup conditions abate. Operators are thus not needed to run the system. However, in its less preferred form, the invention is operable without backflow preventing valves. The cost of a backup water preventing system of the invention is a small fraction of the cost of other methods heretofore utilized to prevent or minimize water backup problems.

To understand better the basic components which constitute each preferred backup water installation shown by boxes 2A, 2B, etc., in FIG. 1, reference should now be made to FIGS. 2 and 3.

FIG. 2 is a plan view of a street 1. A sanitary sewer line 4B is shown running beneath one side of the street and a storm sewer line 4A is shown running beneath the opposite side of the street. To install a backup water control installation in both of these sewer lines, a section of the street 1 identified by the reference character D is broken up to enable the installation of a storage tank 25 for the sanitary sewer line water and tanks 22 and 24 for storm sewer line water which cannot be accommodated by the sanitary and storm sewer lines. The tanks 22, 24, and 25 are installed end to end below the street, at a depth well below the deepest basement level (L1 FIG. 3) and preferably just below the level of the sewer line involved. These tanks are preferably standard gasoline storage tanks which can have a diameter of from 12 to 14 feet, and a length of about 20 feet. While it may be possible in many cases to place these storage tanks in the easement space available to one side of the street, in most cases these storage tanks would be buried beneath the level of the street involved as indicated in FIG. 2. A connecting pipe 23 extends between the bottom portions of the tanks 22 and 24, as best shown in FIG. 3. Each storage tank used in the present invention must have an air vent which may comprise a pipe 27 or 27' (see FIG. 3) which extends preferably to the nearest manhole 28 or 32. This is important so as not to build up a back pressure within the upper extremity of these tanks as water rises therein.

FIG. 3 shows a pump 36 resting on the bottom of the storage tank 22. The details of the backup water control system 2B associated with the sanitary sewer line 4B will not be described in detail, it being understood that, except for additional storage tanks, the installation 2B will be substantially identical to the installation 2A for the storm sewer line 4A now to be fully described.

FIG. 2 shows a sanitary sewer line connecting conduit or pipe 16B extending between a dwelling 14 and the sanitary sewer line 4B to the left of a driveway 18. FIG. 2 also shows a storm sewer line connecting conduit or pipe 16A extending between the dwelling 14 and the storm sewer line 4A also at a point to the left of the driveway 18.

Depending upon circumstances, it may or may not be necessary to remove the entire length of the sewer line 4B and/or 4A falling between the section D of the street 1 which has to be removed to install the storage tanks 22, 24, and 25. However, at least a short length of these sewer lines must be removed to permit the installation of a backflow preventing valve unit like valve unit 34 shown FIGS. 3 and 4A. The backflow preventing valve unit 34 could be a conventional backflow preventing valve or a unique one as shown. The unique unit 34 has a pair of float controlled valve cover sections 34a and 34b so that if one section fails to close because of obstructions or other reasons, the other could close under water backup conditions. A conventional backflow preventing valve generally has a single valve cover section. Examples of such single section backflow preventing valves which are useful in the present invention are disclosed in U.S. Pat. Nos. 2,868,380 and 2,928,410. The valve cover sections 34a and 34b are preferably constructed to operate in a manner like that disclosed in these patents where the valve is normally open and closes under back pressure. Other less desirable commercial backflow preventing valves are normally closed and are forced open by forward water pressure. These are also useable in the present invention.

Each valve cover section comprises a valve cover like 35 and an associated compressible float like 37 which is unlike that shown in these patents. As illustrated when there is no water in the valve unit, the valve cover will be in an open position. As water builds up in the valve unit the float 37 rises to pivot the cover gradually into a more closed position where it finally can completely seal off the sewer lines connected to the valve. Thus, when the valve unit is full of water, the cover does not yet fully cover and seal the opening 33a adjacent to it. Water will thus continue to flow through the more restricted opening of the valve. However, when water backup occurs, the back pressure is sufficient to fully close and seal the valve cover around the adjacent opening 33a to close the sewer line.

As disclosed in FIGS. 3 and 4A, the backflow preventing valve unit 34 has a housing 34c having a cylindrical coupling section 34d projection from one end which abuts a sewer line section 4A. A seal is provided thereat by a suitable sealing means 34e. There is projecting from the cylindrical coupling section 34f which is placed in abutment with an adjacent sewer line section 4A'. The point of joinder of the coupling section 34f and the sewer line section 4A' is sealed by sealing means 34g. The sealing means 34e and 34g could be a band of rubber clamped around the juncture line by suitable clamping means (not shown).

One of the unique portions of the present invention is the provision of a water overflow opening in the system. When a backflow preventing valve is used, this opening 34h is preferably placed at the upper end of the valve unit housing 34c. A standpipe 35 having water pass-through openings 35a–35b extends into the opening 34h and rests on the bottom of the valve housing. If no valve unit is used, this opening 34h is placed in the top of the sewer line involved. A float switch unit FS is mounted in this standpipe above the level of sewer line for reasons to be explained. The upper end of the standpipe 35, which preferably extends to a point near but below the basement level line L1, is open and a drain pipe 39 extends from a side of the standpipe near its upper end. Water rising in the standpipe 35 reaching the drain pipe 39 drains into the storage tank 22. Water in the tank 22 will also flow through the connecting pipe sections 23 to the adjacent storage tank 24 so that the water is at the same level in the two tanks 22 and 24. A float switch unit FS' is positioned adjacent the pump 36 on the bottom of the storage tank 26 to operate the pump in a manner to be described.

The entire backflow preventing valve unit 34 is exposed for installation and removal at the bottom of a manhole 28 constructed in the more or less conventional way. A step ladder 26 is mounted on one side of the manhole to permit a service person to climb down to the bottom of the manhole to gain access to the standpipe 35, which is removable from the unit, and to the valve unit 34 which readily fits into the manhole for installation or removal. The top of the manhole 28 is covered by a conventional manhole cover 31.

Access to the pump 36 in the bottom of the storage tank 22 is gained by a preferably larger manhole 32 mounted downstream from the manhole 28. The manhole 32 includes a step ladder 33 to permit the installer to climb down to the bottom of the manhole which terminates at the top surface of the storage tank 22. The step ladder continues down below the manhole 32 where it reaches into the bottom of the tank 22. The storage tank 22 is provided with a large aperture 29 around which the defining walls of the manhole extend. Entry to the manhole 32 is obtained through an opening covered by a manhole cover 30.

The pump 36 has a housing 36a having a water inlet opening 36b and a water outlet pipe 36c which extends up into the manhole 32. The top of the discharge pipe 36c joins the inlet end of a backflow preventing valve unit 37. The backflow preventing valve unit 37 has an outlet pipe 36d which connects to the storm sewer line section 4A' downstream from the backflow preventing valve unit 34, to discharge water from the storage tanks 22 and 24 into the storm sewer line section 4A' when there is no backup conditions in the storm sewer line. The backflow preventing valve unit 37 prevents backflow of water in the storm sewer line section 4A' into the storage tank 22 under backflow conditions.

Mounted on the surface of the ground to one side of the street 1 is shown a standby power supply unit 40.

This standby supply unit may be gas operated. AC power is fed to a control panel (not shown) in the housing 40a of the standby power supply unit 40 located behind a locked entry door 42. Whenever AC power to the control panel is interrupted, gas is automatically fed to a gas powered motor generator which will generate the proper AC voltage to operate the electrical portions of the system now to be described. The control panel mounted behind the door 42 includes a manual on-off switch 44 (FIG. 7) which, when closed, will automatically feed AC power to the motor portion of the pump 36, to operate the pump under manual control. The circuit diagram of FIG. 7 shows a pair of power lines P1 and P2 between which is connected the manual on-off switch 44 in series with a pump control relay 46. When the relay is energized, power is fed to the motor portion of the pump 36.

Various electrical conductor-containing conduits 47, 48, 50 and 51 are shown which connect to a junction box 52 (FIG. 3). The conduit 48 extends between float switch unit FS in the standpipe 35 and the junction box 52. A conduit 51 is connected between pressure switches to be described forming part of the backflow preventing valve unit 34 and the junction box 52. A conduit 50 extends between the junction box 52 and the float switch unit FS' adjacent to the pump 36. A conduit 47 extends between the junction box 52 and the control panel installed behind the locked door 42 of the standby power supply unit 40.

To understand the operation of the entire backup water control system, it is necessary first to understand the operation of the float switch unit FS mounted within the standpipe 35, float switch unit FS' mounted adjacent to the pump 36 and pressure switch units PS and PS'' operated by the valve unit 34. To this end, reference should now be made to FIGS. 4A, 5, and 6 which show these switch units. As shown in FIGS. 5 and 6, the float switch units FS and FS' comprise housings 37a and 37a' from which extend flexible cords 37b and 37b' connected to float balls 37c and 37c'. Each float ball has a pool of mercury and a pair of contacts as is (not shown) conventional in float switches. The placement of the contacts and the amount of mercury is selected so that the contacts are bridged by the mercury to close the switch formed thereby when the float ball is at a selected elevation.

When there is no water in the storage tank 22, the float ball 37c' is lying on the bottom of the tank, so that the body of mercury therein will not extend between these contacts. When, however, the float ball 37c' floats to any significant extent, the pool of mercury therein will then be oriented so as to interconnect the contacts. The mercury and the two contacts just described are diagrammatically illustrated by the normally-open set of contacts FS'-1 in FIG. 7.

The contacts and pool of mercury within the float ball 37c of float switch FS in the standpipe 35 operate in the opposite way to which the mercury and contacts operate in the float ball 37c' just described. Thus, the float ball 37c when in a lowered position as best shown in FIG. 4 acts as a normally-closed switch FS-1 shown in FIG. 7. In the lowered position of the float ball 37c, its pair of contacts are covered by the mercury pool. When there is no water in the system, the contacts FS-1 shown in FIG. 7 are thus shown closed. When the float ball 37c in the standpipe begins to float, because backup of water in the storm sewer line causes the water to rise in the standpipe 35, the pool of mercury separates from the contacts therein. Since the contacts FS-1 are connected in series with the storage tank float switch contacts FS'-1 which are open when the storage tanks are empty, the pump 36 cannot be automatically energized when there is no water in the standpipe or storage tank. This condition is sometimes referred to as the dormant mode of operation of the backup water control system of the present invention.

When the system does not include the backup preventing valve unit 34, or the valve unit 34 once installed is removed for some reason, the standpipe float switch FS operating with the float switch FS' in the tank 22 will control the system properly if the control panel terminals to be connected to the conductors leading from the valve switches PS and PS' to be described are shunted. In such case, the valve unit 34 is replaced by a sewer line section with an overflow opening in the top thereof. The standpipe 35 is then dropped into this opening as it was dropped into the overflow opening of the valve unit 34.

The presence of the backflow preventing valve unit 34 can create a problem in the possible circumstances where there is a continuing backflow condition downstream from the backflow preventing valve 34 which closes the valve and rain has ceased on the upstream side thereof. In such case, the water drains from the standpipe 35 so that float switch FS-1 in the standpipe is closed. If there is water in the storage tanks 22, 24 float switch FS'-1 is closed. If the pump 36 is then energized, the pump would be working but water could not be pumped into the full sewer line 4A'. It is then desirable to prevent the unnecessary energization of the pump 36 when there is no water in the standpipe 35 and there is still some water in the tank 22 to be pumped out.

To avoid this problem, normally-closed pressure switches PS and PS' are respectfully associated with backflow valve cover sections 34a and 34b so that if either one of these cover sections operates to close off the sewer system, the associated pressure switch contacts will open to prevent energization of the pump 36. These pressure switch contacts are shown as contacts PS-1 and PS'-1 in FIG. 7 connected in series with the float switch contacts FS-1 and FS-1'. Thus, whenever a backflow condition exists which causes the backflow preventing valve cover sections 34a or 34b to close off the sewer line, either the switch PS-1 or PS-1' will open to prevent the energization of the pump operating relay 46.

The water backup preventing system described has three modes of operation. FIG. 3, 4, and 7 show the condition of the system in the dormant mode when no water is flowing in the system. FIGS. 8-10 show the condition of the system in its backup preventing mode where the rate of water flowing into the sewer line exceeds the capacity of the sewer lines. FIGS. 11 and 12 show the condition of the system in its storage tank emptying mode.

In accordance with one of the specific features of the invention, as best shown in FIG. 4B, the standpipe 35 is provided with a backflow condition indicating tube 41 secured in any way to the outside of the standpipe. This tube 41 is mounted in a fitting 43 which has a horizontally extending inlet tube 43a suitably secured within an opening 35c in the standpipe immediately above the top of the backflow preventing valve housing 34c. The inlet tube 43a has an entry passageway 43a' communicating with a vertical passageway 43b in the fitting. Any suitable one-way valve 43c is placed in the path of flow of water through the inlet passageway 43a' and the passageway 43b so that water can only flow upwardly into the tube 41, unless a water draining pushbutton 45 is depressed. The pushbutton has a pin 45a which pushes a ball 43c' of this valve up to remove the ball from a ball seat 43c ".

Whenever there is a backup condition in the system causing the backflow preventing valve unit 34 to close the sewer line section involved, further buildup of water behind the closed valve will, as previously indicated, cause water to flow upwardly into the standpipe 35. Water will also rise in the backflow preventing tube 41 to the same level as the water will be in the standpipe 35. When backflow conditions subside, the water will drain from the standpipe 35, but the water will remain in the backflow indicating tube 41 as a record of the fact that backflow conditions occurred in the system. This record is kept even though the water doesn't rise high enough in the standpipe 35 to flow through the drain pipe 39 into the storage tank 22.

Indicating means is preferably provided to alert persons at ground level that a backflow condition has occurred. To this end, a pair of contacts 47' project into the fitting 43 above the one-way valve 43c. When water covers these two contacts, it places a sufficiently small resistance between these contacts to either directly, or indirectly as through a current amplifier, effect the energization of a relay 53 mounted on the control panel within the standby power supply unit 40. FIG. 4B shows a conductor 49 connected to one end of a relay 53 whose other end is connected to power line P1. Another line 49' is shown extending to the power line P2. When water covers contacts 47' conductors 49-49' are effectively shorted to energize relay 53. The relay 53 has a pair of normally-open contacts 53-1 connected in series with an indicating means, such as an LED or incandescent lamp 57, between the power lines P1-P2. Accordingly, the light indicating means 57 will be energized when water covers the contacts 47 in the fitting 43. The light indicating means 57 is preferably mounted to be visible on the outside of the housing of the standby power supply unit 40 (FIG. 3). If desired, the tube 41 can be provided with a plurality of pairs of contacts (not shown) at different elevations in the tube 41, and individual indicating means controlled as described for means 57 and visible on the outside of the housing of the standby power supply unit 40 indicates the level of the water in the tube 41. After a rainstorm, an employee of the sewer department of the town or city involved can drive by all of the standby power supply units of the city to see where a backflow condition had occurred in the town or city involved during the previous rainstorm. When he spots such a condition as indicated by energized indicating means 57, he enters the manhole 28 nearby to examine the level of the water in the indicating tube 41 to see the degree of backup which had occurred. He resets the backflow indicating means by depressing the pushbutton 45 which empties the tube 41.

It is also envisioned that the level of the water in tube 41 would be indicated by a radio telemetry system which provides at a central location in the city involved the liquid level conditions in all of the tubes 41 for all the backflow preventing installations in that city.

In the backflow preventing installation of the present invention just described, an unconventional backflow preventing valve construction was shown in which the switches PS-1 or PS-1' are incorporated into the backflow preventing valve. In accordance with the form of the invention now to be described, the backflow valve 34' has a more conventional construction where the switches PS-1 or PS-1' are not integrated into the backflow preventing valve. In such case, the float switch FS in the standpipe 35 is replaced by a suitable switch FS" which has contacts FS"-1 (FIG. 14) which opens under backflow pressure and closes when backflow conditions downstream of the valve abate.

The backflow preventing valve shown in FIGS. 13, 15A, and 15B is of a more conventional construction where a valve cover 34a' connected through a linkage 34b' to a pivotally mounted pair of floats 37'-37'. This linkage is designed so that the cover 34a' will remain in a substantially open condition to minimize interference with water flow through the associated valve opening 33a' until the floats 37'-37' reach their upper extremity and backflow pressure causes the cover 34a' to close and seal completely over the opening 33a'.

The backflow preventing valve 34', the standpipe 35, and the switch FS" are all accessible at the bottom of the manhole 28'.

Refer now to FIG. 16 which illustrates an application of the present invention to a combined storm sewer and sanitary sewer line system in two different areas of a city, town, or the like, where these sewer line systems have been modified to incorporate backflow preventing installations of the present invention which are interconnected so that the backflow preventing installations in one area of a city receives overflow water from the other area when its storage tank capacity is not yet exceeded.

As shown in FIG. 16, a main trunk line 50 leads to a sewage treatment plant (not shown). This trunk line 50' connects with main or interceptor sewer lines 10A and 10A' of adjacent areas of a city or town. The main sewer line 10A connects with branch lines 4A', 4B', 4C', etc. and the main sewer line 10A' of the other area connects with branch sewer lines 4A", 4B", 4C", etc. In the absence of the present invention, these branch sewer lines are not interconnected with each other, although they join the main trunk line 50'. In a manner to be described, what would normally be the terminating ends of these branch sewer lines are interconnected by common manholes 52A, 52B, 52C, etc.

In FIG. 16, backflow preventing installations 2A' and 2B' are installed at spaced points in the main sewer line 10A, and backflow preventing installations 2A" and 2B" are installed at spaced points in the main sewer line 10A'. These various backflow preventing installations operate in the same manner as previously described.

Refer now to FIG. 17 which shows the construction of one of the manholes 52A, the other manholes being identically constructed. The manhole 52A includes a cylindrical casing 54 terminating in a manhole cover 56. The terminating end of the branch sewer line 4A' and the terminating end of the branch sewer line 4A" are connected to a bridging sewer line section 63 which has a closure wall 61 which prevents direct flow of water between the adjacent sewer line sections 4A' and 4A".

Water which backs up in one of the branch lines 4A' or 4A" flows into an associated standpipe 60 or 60' which extends into the manhole 52A to a level just below basement line level.

Assuming that the capacity of the backflow preventing installations associated with branch sewer line 4A' is exceeded, while the storage capacity of the backflow preventing installations associated with the branch sewer line 4A has not been exceeded, water will flow into the standpipe 60. When the water overflows this standpipe, it drains into the manhole 54. When the water in the manhole rises to the level of the other standpipe 60', water flows into the branch sewer line 4A'' leading to the main sewer line 10A' which contains the backflow preventing installations 2A'' and 2B'' which operates in the manner previously described.

As previously indicated, while the storage tanks 22 and 24 can be conventional gasoline-type storage tanks, to provide for maximum water capacity expansion in the easiest manner, it is preferred that these storage tanks be constructed from large diameter interceptor sewer line sections usually made of concrete. Such large sewer line sections are shown in FIGS. 18 and 19. The storage tank 22 previously described is replaced by a concrete storage tank 22' made up of one or a number of desired sewer line sections which are closed off at the end portions thereof by closure caps 22B' and 22A'. If at any time it is desired to expand the capacity of the storage tanks associated with a particular backflow preventing installation of the invention, the street section involved must be broken up, the end cap, like 22B', is removed for insertion of the projecting end 64 of another sewer line section 24'. The projecting end 64 of one sewer line section extends into a recess 62 in the other. Additional sewer line sections may be added as needed in this manner. The removed end cap 22B' is then connected and sealed over the open end of the last added sewer line section.

Refer now to FIGS. 20–22 which illustrate an improvement in the invention which has a special, although not only, application to a combination storm and sanitary sewer system to which the present invention has already been installed. Sometimes flooding problems are worse in the one part of a city than in another portion thereof because of the differences in water drainage patterns. If in such an area, an existing storm and/or sanitary sewer system having the present invention installed as shown in FIGS. 1–19 and carrying both street run-off and building water sources, is found inadequate to alleviating a backup problem, then we added it is recommended that a separate sewer line, such as 10A and 4A'' in FIG. 20 into which only street drain water flows. At each point in this area where the present invention is installed along a given main street or side street, this street collected water is drained into an expanded water storage area line 22A as shown in FIG. 20 by connecting pipes. This expanded water storage area could be a huge underground water storage area that could run a block or more long under the street involved. It would have a bottom extremity at the same level as the bottom of the associated originally installed water storage tanks 22–24 or 22' previously described. The upper extremity of this added water storage area 22A could be just below street level (see FIG. 22). Backup into the combination storm and sanitary sewer from this large water storage area which now extends far above basement level is prevented by a backflow valve 37'' in series with the drain pipe 39 extending from each overflow standpipe 35 in each manhole 28 (FIG. 21). This newly added water storage area is drained by operation of the pump 36 in the storage tanks 22–24 or 22' as previously described.

FIG. 20 shows two such underground water storage areas 22A in two side streets 72–74 which could be spaced many blocks apart. The added street run-off water sewer lines 10A and 4A'', etc. are shown beneath one side of the main street 66 and side streets 72 and 74. FIG. 20 shows side street run-off water drains 68' draining directly into the adjacent added storage areas 22A and 22A and main street run-off water drains 68 draining into the added main street run-off water sewer line 10A''. The sewer line 10A'', in turn, has drain pipes extending horizontally into the added storage areas 22A.

It should be apparent that the particular backup water control installations described provide an effective means for monitoring and automatically minimizing backup flood conditions in any given area in which the invention is installed.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

In the claims to follow, the term "storage tank" is used in a broad sense to encompass both individually movable structures commonly referred to as tanks or much larger structures which are immobile and serve as large water storage reservoirs.

I claim:

1. A water backup preventing system for a given area having a ground buried sewer line for receiving rain and other water, the sewer line being incapable of carrying without backup thereof a given flow rate of water, the sewer line being provided at a given point therealong with at least one overflow opening into which opening water which cannot be handled by the sewer line will rise and overflow, water storage tank means below said sewer line and into which the overflow water from said opening will drain and be temporarily stored, said storage tank means having a volume to store water which cannot otherwise flow in said sewer line, pump means in the bottom portion of the storage tank for pumping water into a downstream portion of said sewer line, and pump control means for the pump means for preventing the operation of said pump means when a water backup condition exists in said sewer line and for automatically rendering said pump means operative when such condition disappears from said sewer line, so that the storage tank means can be substantially emptied and accommodate overflow conditions caused by a subsequent rainstorm.

2. The water backup preventing system of claim 1 wherein said sewer line has therein first backflow preventing valve means, the backflow preventing valve means including means for automatically closing the sewer line when a backflow condition develops downstream therefrom and for opening the sewer line to permit flow of water through the sewer line when such condition does not exist or abates, said overflow opening being on the upstream side of said backflow preventing valve means, and said pump means being connected to pump water into said sewer line downstream from said valve means.

3. The water backup preventing system of claim 1 or 2 wherein there is provided a manhole extending between said sewer line and the surface and surrounding said overflow opening to permit one to gain access to the area of said overflow opening, a standpipe in said manhole communicating with said overflow opening, into which standpipe water rises when backflow conditions exist in the sewer line, and a drain pipe extending between the upper extremity of said standpipe and said storage tank means so that sewer water rising to said upper extremity of the standpipe will drain into said storage tank means.

4. The water backup preventing system of claim 3 wherein there is provided a backflow indicating tube on the outside of the standpipe and into which backflow indicating tube water flows from said overflow opening so that the water in the backflow indicating tube and the standpipe are at the same level, said tube providing an indication of the level of the water therein, and a one-way valve means in said tube which permits water to rise in therefrom, so that when overflow conditions abate and water drains from said standpipe a permanent record remains in said tube of the level to which the water rose in said standpipe.

5. The water backup preventing system of claim 2 wherein there is provided a first manhole which extends from the surface down to the level of the sewer line where it surrounds said backflow opening and said backflow preventing valve.

6. The water backup preventing system of claim 1 or 2 wherein said storage tank has an access opening in the top thereof for permitting the passage of a service person, a manhole surrounding said access opening and extending vertically to the surface, pump water discharge conduit means extending from said pump means upwardly through said storage tank means access opening and connecting with the sewer line downstream from said water overflow opening, and a backflow preventing valve connected with said conduit means for preventing backflow of water from the sewer line into said storage tank means.

7. The water backup preventing system of claim 1 or 2 wherein said pump control means includes prepare means responsive to the absence of water backup conditions in said sewer line for preparing the pump for operation, and storage tank water level sensing means in said storage tank means responsive to the presence of water in the bottom portion of said storage tank means for operating said pump means when prepared for operation by said prepare switch means, when sensing the absence of a water backup condition substantially to empty said storage tank means, said standpipe extending upwardly to an elevation approaching that of the level of the lowest basement in the area involved, and a drain pipe in the upper extremities of said standpipe which carries the water rising up into said extremity into said storage tank means.

8. The water backup preventing system of claim 7 wherein said prepare means includes means responsive to water overflowing said water overflow opening.

9. The water backup preventing system of claim 7 wherein said prepare means includes water level sensing means in a standpipe communicating with and located above said water overflow opening.

10. The water backup preventing system of claim 7 wherein said prepare means includes means directly responsive to the operation of said backflow preventing valve means to a position opening the sewer line.

11. The water backup preventing system of claim 2 wherein said control means includes first water level sensing means operated to a pump operating condition when there is water in the storage tank means to be removed therefrom, first prepare means associated with said system overflow opening and operated to a pump operating condition when water is not overflowing said water overflow opening, and second prepare means operated to a pump operating a condition when said backflow preventing valve has re-opened the sewer line because backflow conditions have abated, and means responsive to the simultaneous presence of pump operating conditions of said first water level sensing means and said first and second prepare means for operating said pump means, to substantially empty said storage tank means.

12. The water backup preventing system of claim 2 wherein said water overflow opening is an aperture in the top of said backflow preventing valve means upstream from the portion thereof which opens and closes the sewer line.

13. The water backup preventing system of claims 1 or 2 wherein there is a standpipe extending above and around said water overflow opening, and drain pipe means extending from said standpipe at a point above said sewer line for draining water from said standpipe into said storage tank means.

14. The water backup preventing system of claims 1 or 2 wherein there is provided second backflow preventing valve means between the water discharge portion of said pump means and said sewer line for preventing backflow water from gaining access to the storage tank means from said sewer line downstream from said first backflow preventing valve means.

15. The water backup preventing system of claim 7 wherein said prepare means includes float switch means which includes a floatable ball means and switch means in the ball near operable between circuit opening and circuit closing positions when the ball means moves between a lowered non-floating position and a raised floating position, said pump means being electrically controlled pump means to which electrical power is fed when all the float switch means are in a position calling for the operation of said pump means.

16. The water backup prevention or monitoring system of claim 4 wherein alarm means are provided above ground level for indicating to a person above ground level that backflow conditions have occurred at the location involved, and manually operable means for draining water in said backflow indicating tube to reset the system to indicate a new backup condition developing in the sewer line.

17. A water backup preventing system for a given area of a city, town, or the like having various intersecting streets beneath which are sewer lines which include branch sewer lines feeding into at least one common sewer line, a water backup control installation at the point where said branch sewer lines connect with a common sewer line, each of said water backflow control installations including at least one overflow opening at a point in the branch sewer line where it is about the join the common sewer line, water storage tank means below each branch sewer line and into which the overflow water from said opening will drain and be temporarily stored, said storage tank means having a volume to store water which cannot otherwise flow in said branch sewer line, pump means in the bottom portion of the storage tank, and pump control means for the pump means for preventing the operation of said pump means when water backup water conditions exist in the associated branch sewer lines and for automatically rendering said pump means operative when backflow conditions disappear from the associated branch sewer lines so that the storage tank means involved can be substantially emptied and accommodate overflow conditions caused by a subsequent rainstorm.

18. The water backup preventing system of claim 17 wherein adjacent the point where each of said branch sewer lines joins said common sewer line there is installed in the branch sewer line downstream from said water overflow opening backflow preventing valve means, the backflow preventing valve means including means for automatically closing the branch sewer line involved when backflow conditions develop downstream therefrom and for opening the branch sewer line to permit flow of water through the branch sewer line involved when such conditions abate, said overflow opening being on the upstream side of said backflow preventing valve means, and said pump means connected to pump water into said branch sewer line downstream from said valve means.

19. The water backup preventing system of claim 18 wherein said branch and common sewer lines are sanitary sewer lines, said common sewer line leading to a sewage treatment plant, there being installed between the end of said common sewer line and said sanitary treatment plant one of said water backflow control installations, there being at least one water storage tank means to accommodate many more gallons of water than can the storage tank means in any one of said branch sewer line water backup control installations.

20. The water backup preventing system of claim 1 or 2 wherein said storage tank means holds at least 25,000 gallons of water.

21. The water backup preventing system of claim 1 or 2 wherein said storage tank means comprises at least two physically separate storage tanks, with means interconnecting the bottom portions of said storage tanks, said pump means being in only one of said storage tanks.

22. The water backup preventing system of claim 1 or 2 wherein all of the water storage tank means associated with said water backflow control system are buried below the street.

23. The water backup preventing system of claim 2 wherein there is provided a manhole extending between said sewer line and the surface and surrounding said overflow opening to permit one to gain access to the area of said overflow opening, a standpipe in said manhole communicating with said overflow opening, into which standpipe water rises when backflow conditions exist in the sewer line, a drain pipe extending between the upper extremity of said standpipe and said storage tank so that sewer water rising to said upper extremity of the standpipe will drain into said storage tank means and there is premounted in the bottom of said manhole first backflow preventing valve means, the backflow preventing valve means including means for automatically closing the sewer line when a backflow condition develops downstream therefrom and for opening the sewer line to permit flow of water through the sewer line when such condition does not exist or abates, said overflow opening being on the upstream side of said backflow preventing valve means, and said pump means being connected to pump water into said sewer line downstream from said valve means, backup pressure means accessible in said manhole for preventing the energization of said pump when backup pressure closes said valve and operates to prepare the pump for operation when said backup pressure abates, and storage tank water level sensing means in said storage tank means responsive to the presence of water in the bottom portion of said storage tank means for operating said pump means when prepared for operation by said water level sensing means in said second standpipe.

24. The water backup preventing system of claims 1 or 17 wherein said system is in a first given area of a city, town or the like and there is provided a backup preventing system like that claimed in an adjacent area of the city, town, or the like, and means interconnecting the sewer lines of these two areas so that if the water storage capacity of the tanks of the backup preventing system in one of the areas is exceeded while that of the other area is not, any resulting backup in the sewer lines involved will flow into the sewer lines of the other area where the backup preventing system storage tank means can store such backup water or water can flow in the sewer lines of the other area.

25. The water backup preventing systems for the two areas referred to in claim 24 wherein there are branch sewer lines in the two areas which extend to common manholes, standpipe means in these manholes into which backup water flowing from the branch sewer line of one of the areas where the storage capacity of said storage tank means therein has been exceeded can rise and then flow into the branch sewer line in the other area connecting to said manhole.

26. The water backup preventing system of claims 1 or 17 wherein said storage tank means comprise one or more interceptor sewer sections many feet in diameter, the one or more sewer line sections being sealingly interconnected with the outermost ends of the connected sewer line sections capped to define a storage tank therebetween.

27. The backflow preventing system of claim 1, 2, 17 or 18 wherein said sewer line collects only water from pipes extending from buildings and there is provided in addition to said sewer line an auxiliary sewer line for receiving only storm water from sources like street run-off water drains which are not directed from pipes extending to buildings, a water storage area including or communicating with said storage tank means and into which water drains from said auxiliary sewer line, said water storage area extending above the level of the basements in the area, backflow preventing valve means between said overflow opening and said storage tank means to prevent water in said storage area above basement level from causing water flow into said first mentioned sewer line and then into buildings having water drain connections thereto, the water flowing into said storage area being pumped by said pump means in said storage tank means into said downstream side of said first mentioned sewer line.

28. The backflow preventing system of claim 27 wherein the first mentioned storage tank means has an upper extremity below the basement line of the buildings in the area, said water storage area into which water drains from said auxiliary sewer line being a separately constructed water storage area having a bottom extremity approximately at the level of the bottom extremity of said storage tank means and an upper extremity above the basement level of the buildings in the area, the bottom portions of said storage tank means and said water storage area being at approximately the same level and being interconnected, wherein the pump means in said storage tank means empties both the storage tank means and said water storage area into which water drains from said auxiliary sewer line.

* * * * *

UNITED STATES PATENT AND TRADEMARK OFFICE
CERTIFICATE OF CORRECTION

PATENT NO. : 4,892,440

DATED : January 9, 1990

INVENTOR(S) : Patrick Regan

It is certified that error appears in the above-identified patent and that said Letters Patent is hereby corrected as shown below:

Column 17, claim 4, lines 13-24 should appear as shown below:

4. The water backup preventing system of Claim 3 wherein there is provided a backflow indicating tube on the outside of the standpipe and into which backflow indicating tube water flows from said overflow opening so that the water in the backflow indicating tube and the standpipe are at the same level, said tube providing an indication of the level of the water therein, and a one-way valve means in said tube which permits water to rise in said tube to prevent such water from draining therefrom, so that when overflow conditions abate and water drains from said standpipe a permanent record remains in said tube of the level to which the water rose in said standpipe.

Signed and Sealed this

Twenty-eighth Day of January, 1992

Attest:

HARRY F. MANBECK, JR.

*Attesting Officer*        *Commissioner of Patents and Trademarks*